US 7,447,817 B1

(12) United States Patent
Sripada

(10) Patent No.: US 7,447,817 B1
(45) Date of Patent: Nov. 4, 2008

(54) METHOD AND SYSTEM FOR PROCESSING ARBITRATION REQUESTS

(75) Inventor: Srinivas Sripada, Roseville, CA (US)

(73) Assignee: QLOGIC Corporation, Aliso Viejo, CA (US)

( * ) Notice: Subject to any disclaimer, the term of this patent is extended or adjusted under 35 U.S.C. 154(b) by 92 days.

(21) Appl. No.: 11/430,704

(22) Filed: May 9, 2006

(51) Int. Cl.
*G06F 13/368* (2006.01)

(52) U.S. Cl. .................. 710/120; 710/240; 710/113; 710/123

(58) Field of Classification Search ......... 710/240–244, 710/107, 120, 113, 123
See application file for complete search history.

(56) References Cited

U.S. PATENT DOCUMENTS 5,680,554 A * 10/1997 Baek .................... 710/107
7,120,714 B2 * 10/2006 O'Connor et al. ......... 710/243
2006/0047873 A1 * 3/2006 Bose et al. .............. 710/243
2007/0186027 A1 * 8/2007 Klema et al. ............ 710/317

* cited by examiner

*Primary Examiner*—Clifford Knoll
*Assistant Examiner*—Kim T Huynh
(74) *Attorney, Agent, or Firm*—Klein, O'Neill & Singh, LLP

(57) ABSTRACT

Method and system for arbitrating between plural arbitration requests is provided. The system includes a plurality of first stage arbiters that receive plural arbitration requests and a signal that indicates a previously granted request, wherein the first stage arbiters assert a high priority request signal if a high priority request is pending and a low priority request signal is asserted, if a low priority request is pending; a second stage arbiter that arbitrates between high priority requests, when high priority requests are pending; wherein if a high priority request is not pending, then a low priority request is granted; and a data handler module that operates in parallel with the second stage arbiter to immediately move data associated with a request that is granted at any given time.

16 Claims, 6 Drawing Sheets

METHOD AND SYSTEM FOR PROCESSING ARBITRATION REQUESTS

BACKGROUND

1. Field of the Invention

The present invention relates to computing systems, and more particularly to arbitration techniques requesting bus/memory access.

2. Background of the Invention

Conventional computing systems typically include several functional components. These components may include a central processing unit (CPU), main memory, input/output ("I/O") devices, and streaming storage devices (for example, tape drives). In conventional systems, the main memory is coupled to the CPU via a system bus or a local memory bus. The main memory is used to provide the CPU access to data and/or program information that is stored in main memory at execution time. Typically, the main memory is composed of random access memory (RAM) circuits. A computer system with the CPU and main memory is often referred to as a host system.

Host systems are used in various network applications, including storage area networks ("SANs"). In SANs, plural memory storage devices are made available to various host computing systems. Data in a SAN is typically moved between plural host systems and storage systems (or storage devices, used interchangeably throughout this specification) through various controllers/adapters. Host systems often communicate with storage systems via a host bus adapter ("HBA", may also be referred to as a "controller" and/or "adapter").

Host systems often communicate with peripheral devices via an interface such as the Peripheral Component Interconnect ("PCI") interface, a local bus standard that uses parallel data transfer, or the extension of PCI known as PCI-X. Both the PCI and PCI-X standard specifications are incorporated herein by reference in their entirety.

More recently, PCI-Express, a standard interface incorporating PCI transaction protocols has been developed. PCI-Express is an Input/Output ("I/O") bus standard (incorporated herein by reference in its entirety) that is compatible with existing PCI cards using the PCI Express bus.

HBAs (a PCI-Express device) that are placed in SANs, receive serial data streams (bit stream), align the serial data and then convert it into parallel data for processing. HBAs operate as a transmitting device as well as a receiving device.

Arbitration modules are used in HBAs and other devices (mainly in application specific integrated circuits (ASICs)) to allow access to a bus or a memory location. An arbitration module typically receives requests from different components, for example, direct memory access ("DMA") modules. The arbitration module then arbitrates between the requests and grants access to the winning request. Typically, a round-robin scheme is used to determine which request wins arbitration.

ASIC performance expectations are increasing with high-speed designs. Traditional arbitration techniques are not able to meet the high-speed demand and expectations.

Therefore, there is a need for a method and system for improving arbitration techniques.

SUMMARY OF THE INVENTION

In one aspect of the present invention, an arbitration module for arbitrating between plural arbitration requests is provided. The arbitration module includes a plurality of first stage arbiters that receive plural arbitration requests and a signal that indicates a previously granted request, wherein the first stage arbiters assert a high priority request signal if a high priority request is pending and a low priority request signal is asserted, if a low priority request is pending; a second stage arbiter that arbitrates between high priority requests, when high priority requests are pending; wherein if a high priority request is not pending, then a low priority request is granted; and a data handler module that operates in parallel with the second stage arbiter to immediately move data associated with a request that is granted at any given time.

In another aspect of the present invention, a method for arbitrating between plural arbitration requests is provided. The method includes receiving the plurality of requests for stage arbitration, wherein the first stage arbitration uses a plurality of first stage arbiters that receive plural arbitration requests and a signal that indicates a previously granted request, wherein the first stage arbiters assert a high priority request signal if a high priority request is pending and a low priority request signal is asserted, if a low priority request is pending; sending a high priority request signal to a second stage arbiter, if a high priority request is pending; wherein the second stage arbiter arbitrates between pending high priority requests; sending a low priority request to a low priority request handler; wherein a low priority request is granted when a high priority request is not pending; and transferring data associated with a request that is granted, wherein the data transfer occurs immediately after a request is granted via a data handler module.

This brief summary has been provided so that the nature of the invention may be understood quickly. A more complete understanding of the invention can be obtained by reference to the following detailed description of the preferred embodiments thereof concerning the attached drawings.

BRIEF DESCRIPTION OF THE DRAWINGS

The foregoing features and other features of the present invention will now be described with reference to the drawings of a preferred embodiment. In the drawings, the same components have the same reference numerals. The illustrated embodiment is intended to illustrate, but not to limit the invention. The drawings include the following Figures.

DETAILED DESCRIPTION OF THE PREFERRED EMBODIMENTS

To facilitate an understanding of the preferred embodiment, the general architecture and operation of an overall system will be described. The specific architecture and operation of the preferred embodiment will then be described with reference to the general architecture.

System Overview

Figure 1:
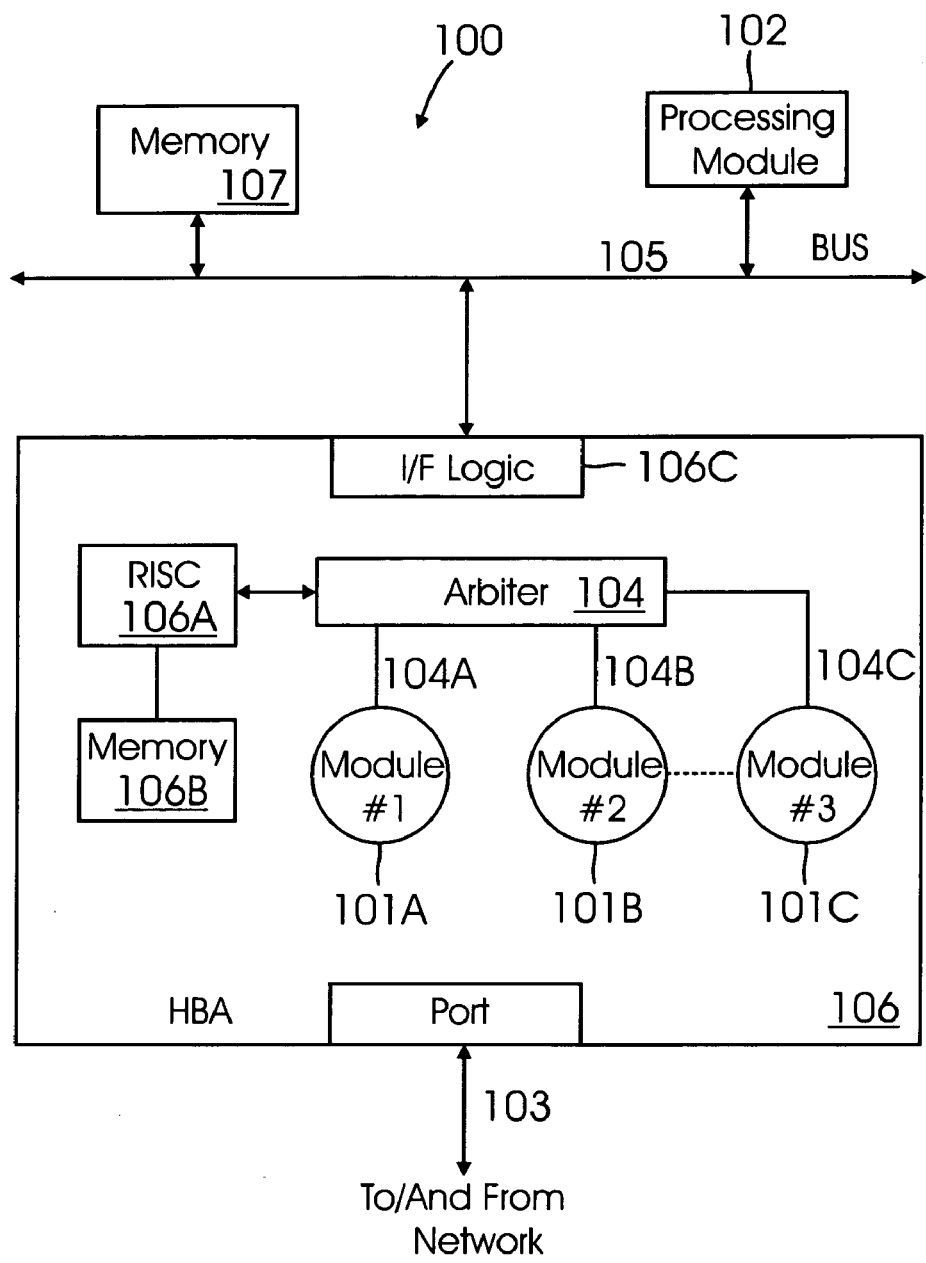
FIG. 1 is a block diagram showing an adapter coupled to a processing module.

FIG. 1 shows a host system 100 that uses a HBA 106 (referred to as "adapter 106") for communication between various storage systems (not shown) via a network connection 103. Host system 100 includes a processing module 102, for example, a central processing unit that executes programmable code out of memory 107. Host system 100 can be a server, a RAID controller or any other computing system. Memory 107 stores a driver that co-ordinates all data transfer via adapter 106 using input/output control blocks.

Adapter 106 has various components, including a central processor (which may be a reduced instruction set computing "RISC" processor) 106A and memory 106B. Adapter 106 interfaces with processing module 102 via bus 105. Bus 105 can be a PCI, PCI-X, PCI-Express bus, or any other type of bus.

Adapter 106 receives information from other devices/systems via network connection 103. The received information is then passed to the host system.

Adapter 106 also facilitates transfer of information from memory 107 to devices/system connected via network connection 103.

QLogic Corporation, the assignee of the present application, designs and manufactures different type of HBAs. More information on these HBAs is available from QLogic's website located at qlogic.com.

DMA modules in general are used to perform transfers between memory locations, or between memory locations and an input/output port. A DMA module functions without involving a microprocessor (for example, RISC 106A) by initializing control registers in a DMA unit with transfer control information. The transfer control information generally includes source address (the address of the beginning of a block of data to be transferred), the destination address, and the size of the data block. When a request is granted, the DMA unit is informed of the grant and memory access is granted to a particular channel.

Modules 101A, 101B and 101C, as shown in FIG. 1, can be DMA modules that send DMA requests (shown as 104A, 104B and 104C) to arbitration module 104 (also referred to as "Arbiter"). Arbitration module 104 interfaces with Interface logic 106C that interfaces with bus 105.

In conventional systems, arbitration module 104 has logic that uses a round robin type algorithm to determine which request should be granted. When a request is granted, the module has access to bus 105 to transfer data.

Multi-Stage Arbitration System

Figure 2:
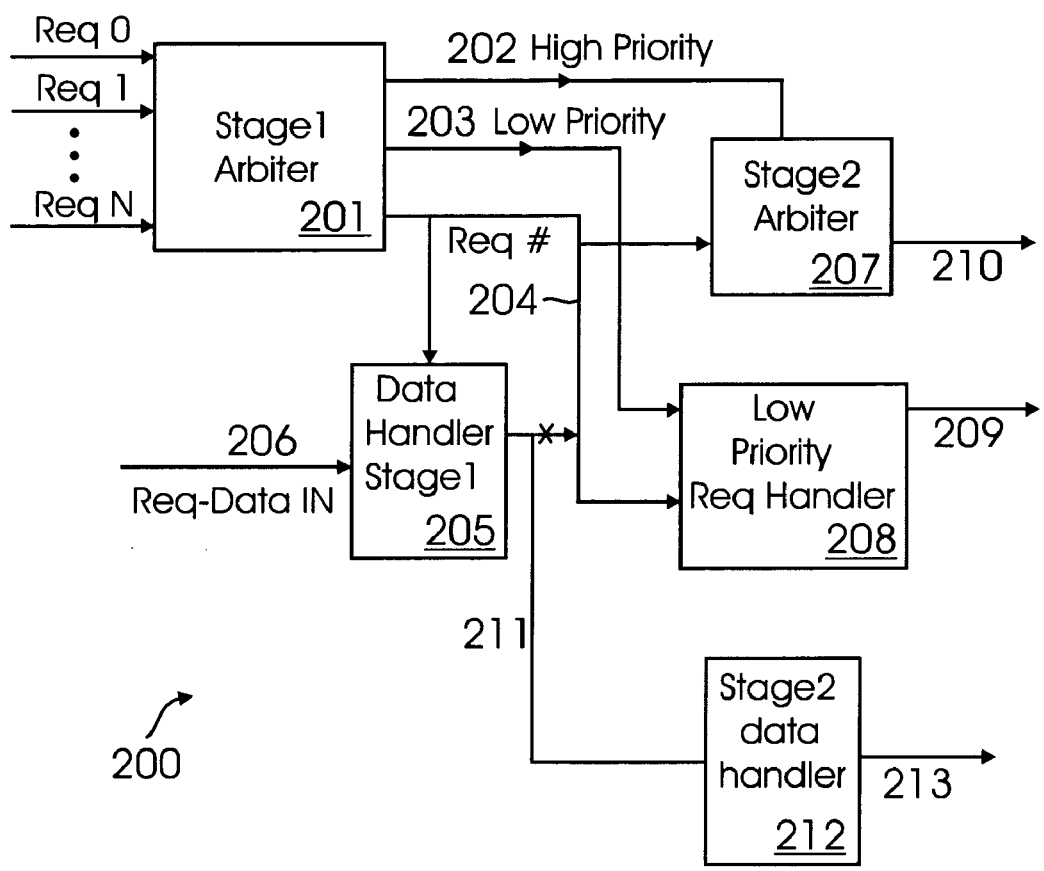
FIG. 2 shows a block diagram of a multi-stage arbitration scheme, according to one aspect of the present invention.

FIG. 2 shows a top-level block diagram of a multi-stage arbitration system 200, according to one aspect of the present invention. System 200 can have multiple stages for processing requests. The term arbiter as used herein refers to logic/executable-code that can arbitrate between plural requests. System 200 uses two-stage arbitration with stage 1 arbiter 201 (also referred to as arbiter 201) and stage 2 arbiter 207 (also referred to as arbiter 207).

Arbiter 201 receives plural requests, shown as Req 0, Req 1 to Req N, where N denotes the number of requests. DMA modules in HBA 106 can generate these requests. The requests can also be from any module in a system that is trying to access a bus, memory location or any shared resource.

Figure 3A:
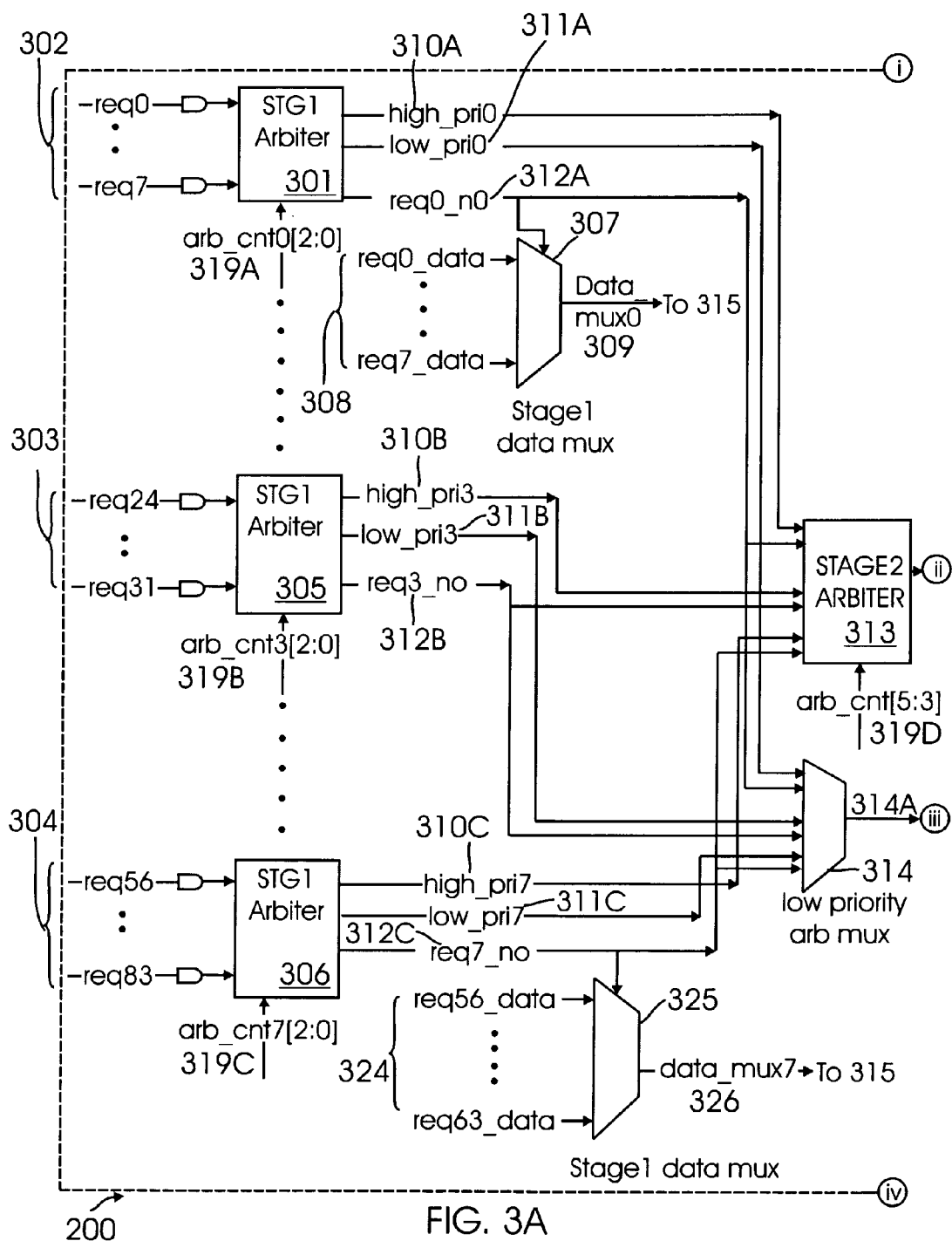
FIG. 3 shows a schematic diagram of an arbitration system, according to one aspect of the present invention.
Figure 3B:
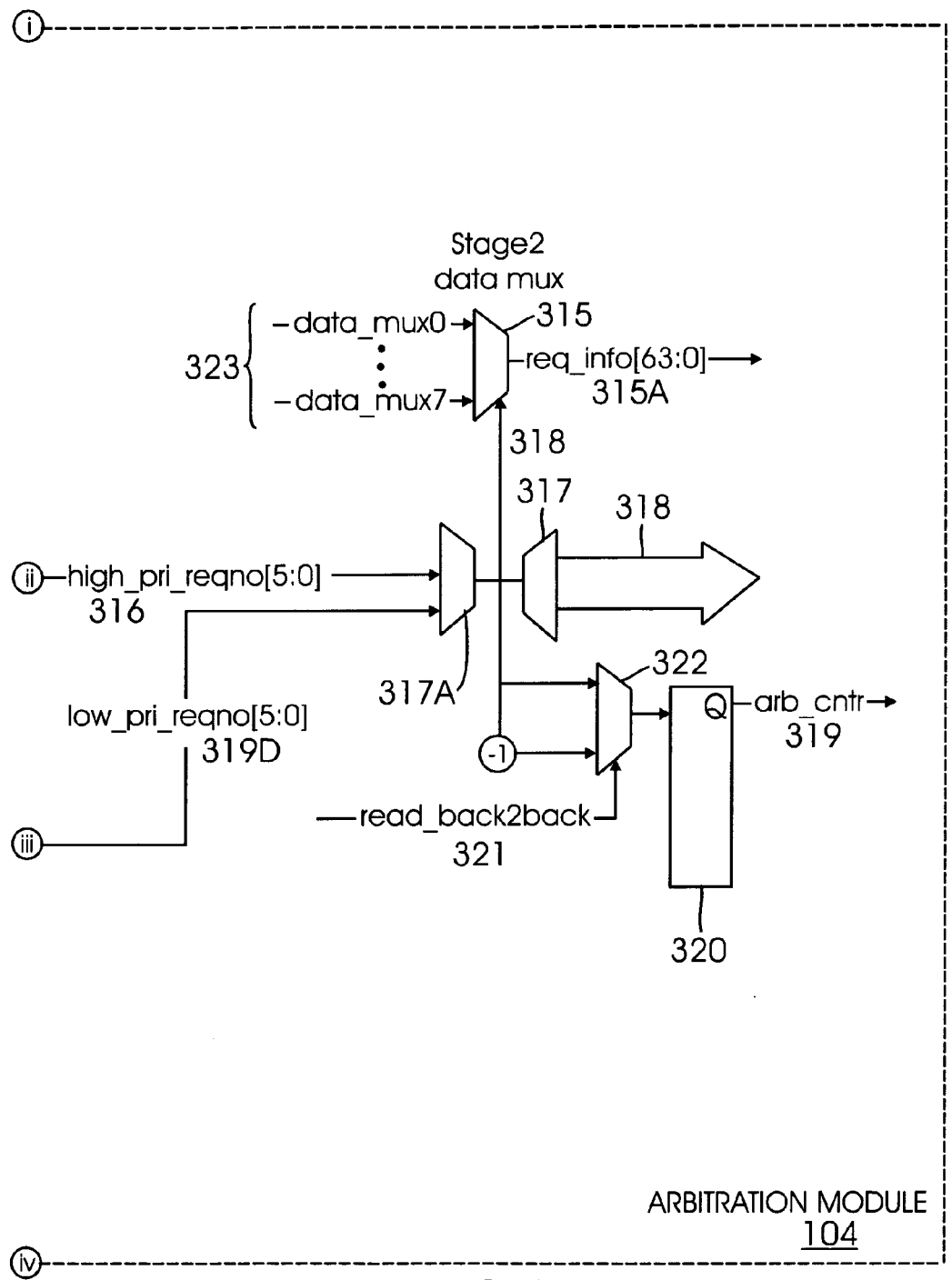

It is noteworthy that although stage 1 arbiter 201 is shown as a single block, one can use multiple arbiters to process requests. For example, stage arbiter 201 can include 8 different arbiters and each arbiter can process 8 requests (as shown in FIG. 3).

Arbiter 1 asserts signal 202 when a high priority request is pending. Signal 202 is sent to arbiter 207. Signal 203 is asserted when a low priority request is pending. Signal 203 is sent to a low priority request handler 208.

Arbiter 201 determines high priority and low priority requests among ReqO-ReqN. This decision is based on programmable factors, as described below with respect to FIG. 3.

When high priority requests are pending, Stage 2 arbiter 207 receives a signal 202 that indicates high priority requests are pending. Arbiter 207 then arbitrates between high priority requests. The high priority requests are arbitrated using a modified round-robin scheme described below with respect to FIG. 3. Once a request is granted, a grant signal 210 is sent to the requesting module.

Low priority request handler 208 processes various low priority requests, when low priority requests are pending. Stage 1 arbiter sends signal 203 to handler 208, which indicates that a low priority request is pending. Handler 208 arbitrates between low priority requests and a grant signal 209 is sent to the requesting module.

In traditional arbitration schemes, data typically lags behind the arbitration request and grant process. In system 200, two stage data handlers (shown as 205 and 212) are used. Stage 1 handler 205 receives the request information (shown as 206) and it operates in parallel with stage 2 arbiter 207. Stage 2 data handler 212 receives data 211 from stage 1 data handler 205 and as soon as a request is granted it is processed, there is minimal lag between the grant and data movement (shown as 213). This is described in more detail below, with respect to FIG. 3.

Although FIG. 2 only shows a two-stage arbitration scheme for convenience, the present invention is not limited to a two-stage arbitration scheme. System 200 is capable of using more than 2 stages for arbitrating requests. Furthermore, stage 1 arbiter 201 may have various arbiters (as discussed below), according to one aspect of the present invention.

FIG. 3 shows a detailed logical implementation for arbitration module (arbiter) 104 within system 200. Arbiter 104 has two stages for processing arbitration requests, stage 1 and stage 2.

Plural stage 1 arbiters (similar to arbiter 201) for example, 301, 305 and 306 operate in parallel. Stage 1 arbiter 301 receives requests 302 (request 0 (Req 0) to request 7 (Req 7)); stage 1 arbiter 305 receives requests 303 (req 24-req 31), while stage 1 arbiter 306 receives requests 304 (req 56-req 63). Each stage 1 arbiter in FIG. 3 processes 8 requests. It is noteworthy that the present invention is not limited to any particular number of requests or number of stage 1 arbiters.

Each stage 1 arbiter also receives an arbitration count value shown as 319A, 319B and 319C. 319A-319C values are based on output 319 from arbitration counter 320, which is described below.

319A-319C values include all the information that is included in 319 and also includes a value that indicates which particular group/request has been granted at any given time. The term group in this context means a set of requests that are handled by a particular stage 1 arbiter. For example, requests 0-7 (shown as req0-req7 (302) received by stage 1 arbiter 301 are designated a group (for example, group 0). Value 319A at any given time indicates to stage 1 arbiter 301 if one of req0-req7 has been granted. The requests received by arbiter 305 and arbiter 306 are designated as separate groups, respectively.

319A-319C values can be based on a 4-bit value, where the first three bits are equal to the value of 319 and the $4^{th}$ bit can indicate whether a request that was granted belonged to a particular stage 1-arbiter group.

Based on 319A-319C, stage 1 arbiters segregate low priority and high priority requests. For example, if the $4^{th}$ bit of 319A indicates that a previous request that was granted belonged to requests 302 (i.e. group 302), then all the requests above the value of 319A are considered high priority requests while others are considered low priority requests. If the $4^{th}$ bit of 319A indicates that the previous request that was granted doesn't belong to group 302, then all the requests in-group 302 are considered as high priority requests. For example, if 319A is equal to 2, and if input requests 3,4,5,6, or 7 are active, then a high priority signal 310A is asserted. If 319A is greater than 7, and any of the input requests are active, then high priority signal 310A is asserted.

Low priority request signals (shown as 311A, 311B and 311C (similar to 203)) are sent to low arbitration multiplexer 314 (similar to low priority request handler 208). Low priority request signals are asserted if at least one low priority request is pending. For example, if 319A is equal to 2, then input request 0, 1 and 2 are treated as low priority requests and signal 311A is asserted. It is noteworthy that typically, one arbiter sends a low priority request signal to Mux 314.

High priority request signals 310A-310C (similar to 202) are sent to stage 2 arbiter 313 (which is similar to arbiter 207). A high priority request signal indicates to stage 2 arbiter 313 that a high priority request from a particular group (based on stage 1 arbiter) is pending. For example, when signal 310A is asserted, it indicates to arbiter 313 that a high priority request from arbiter 301 is pending.

Each stage 1 arbiter also sends request information to stage 2 arbiter 313. For example, arbiter 301 sends signal 312A to arbiter 313, arbiter 305 sends signal 312B and arbiter 306 send signal 312C. Signal 312A-312C includes an encoded value that provides pending request information to arbiter 313. Based on signals 312A-312C, arbiter 313 is aware of each pending high priority requests from each group.

Arbiter 313 operates in parallel with low priority arbitration multiplexer ("Mux") 314. Stage 2 arbiter 313 utilizes 319D (which is similar to 319A-319C) to arbitrate between plural requests.

Arbiter 313 performs a modified round robin scheme to select a particular group and eventually a particular request. In a conventional scheme, an arbiter will have to arbitrate between all requests. For example, with respect to FIG. 3, one arbiter using a round robin scheme will arbitrate all 64 requests (req 0-req 63). In contrast, the present invention provides arbiter 313 that receives 8 high priority signals (based on 8 first stage arbiters). Arbiter 313 then selects one group from the 8 pending groups. This process/scheme is the modified round robin technique used to determine which request is to be granted at any given time.

If high priority request signals are not asserted in stage 2 and a low priority request signal is asserted, then a low priority request (based on 314A) is granted. Logic 317A receives a high priority request number 316 and low priority request number 314A. The actual grant signal 318 via logic 317 is sent to the requesting module.

Signal 318 indicates when a request is granted. Signal 318 is also sent to arbitration counter 320, via Mux 322. Arbitration counter 320 maintains an encoded value that indicates which request/group has been granted at any given time. Arbitration counter 320 generates signal 319 that includes the encoded value, which indicates the request/group that has been granted at any given time.

In one aspect of the present invention, back-to-back requests are processed efficiently. The term back-to-back, as used herein means consecutive requests that are received from the same client. A bit value in signal 315A indicates if the granted request was a back-to-back request. Based on the bit value, select signal 321 is generated, which latches all back-to-back requests.

When signal 321 is asserted, a value of -1 is loaded into arbitration counter 320. This subtracts one from the value of 319. For example, if request number 2 has been granted/serviced at a given time and a next request from the same client/module is pending, i.e. request number 3. Then signal 321 is active and −1 is used to decrease value 319. This will make the pending request number 3 from the same client/module, a high priority request.

In one aspect of the present invention, two stage data Muxes are used to move data efficiently. Stage 1 has plural data multiplexers (for example, 307 and 325). Stage 1 data Mux 307 operates in parallel with stage 2 arbiter 313 while receiving output signal 312A from a stage 1 arbiter 301 (and signal 312C from arbiter 306). Stage 1 data Mux output are sent to a stage 2 Mux. For example, outputs 309 from Mux 307/325 from Mux 325 are sent to stage 2 data Mux 315.

Stage 2 Mux 315 receives input from each stage 1 data Mux (for example, 307) and this is shown as 323 (dat_mux0 to data_mux7). Mux 315 selects a particular input based on signal 318. As discussed above signal 318 indicates which particular group/request has been granted access. Based on the foregoing, output 315A is generated, which includes the data that needs to be transferred. A bit in output 315A indicates if the granted request was a back-to-back request, which activates signal 321, as described above.

Figure 4:
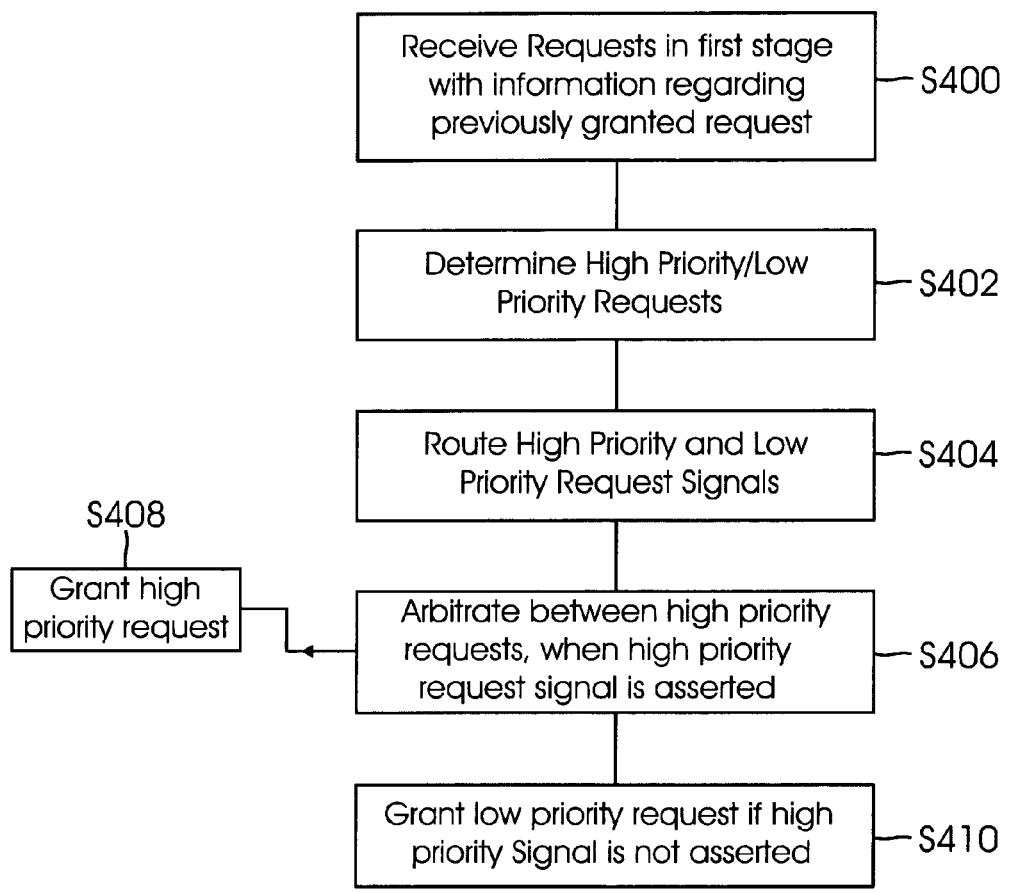
FIG. 4 shows a process flow diagram of an arbitration technique, according to one aspect of the present invention.

Process Flow: FIG. 4 shows a top-level process flow for processing arbitration requests, according to one aspect of the present invention. In step S400, first stage arbitration modules, for example, 301, 305 and 306, receive requests to access a bus or memory location. Stage 1 arbiters also receive information on a request that was previously granted.

In step S402, stage 1 arbiters determine if there are high and low priority requests. Based on that, high priority request signals (310A-310C) and low priority request signals (311A, 311B and 311C) are asserted.

In step S404, high priority signals are routed to a stage 2 arbiter (for example, 313) and low priority request signals to a low priority request handler (or Mux 314).

In step S406, if a high priority signal is asserted, then stage 2 arbiter (313) arbitrates between high priority requests. Thereafter, in step s408, the request is granted. As soon as the request is granted, data associated with the request is also moved (described above).

If high priority signal is not asserted, then in step S410, a low priority request is granted. Once again, data is moved immediately after the grant process without delay.

Figure 5:
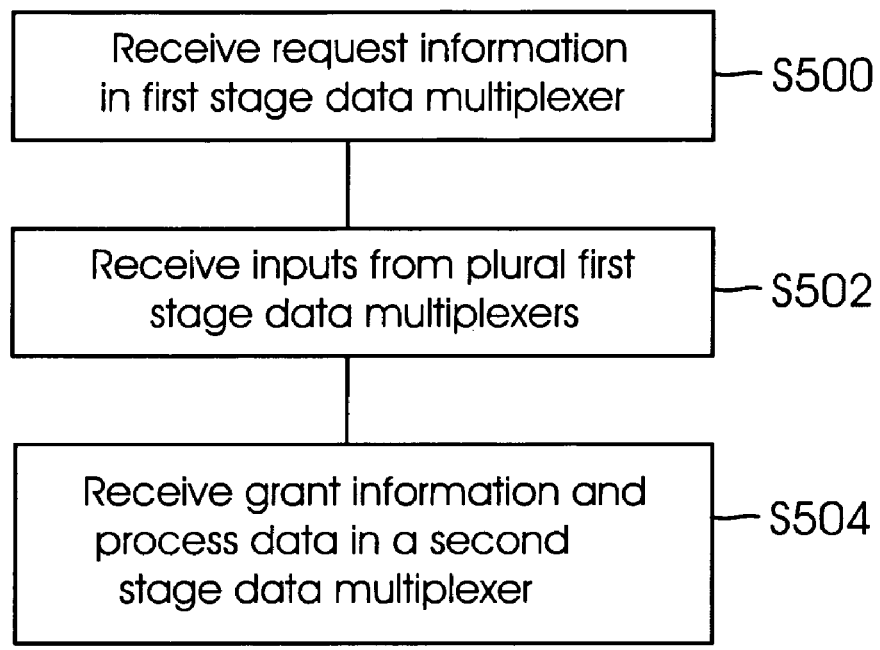
FIG. 5 shows a process flow diagram for moving data as soon as request for bus/memory access is granted, according to one aspect of the present invention.

FIG. 5 shows a top-level process flow diagram for moving data as soon as request for bus/memory access is granted, according to one aspect of the present invention. Turning in detail to FIG. 5, in step S500, data (308) is received in a first stage data multiplexer. This occurs while stage 2 arbiter is processing arbitration requests. In step S502, a stage 2 data multiplexer (315) receives input from plural stage 1 data multiplexers.

In step S504, stage 2 Mux 315 receives information regarding a request that has been granted. Thereafter, data associated with the granted request is sent.

In one aspect of the present invention, stage 1 arbiters can operate in parallel and improve the overall timing of the arbitration process.

In another aspect of the present invention, multi-stage data muxes are used to transfer data as soon as a request is granted. This minimizes delay in moving data.

Although the present invention as been described with reference to specific embodiments, these embodiments are illustrative only and not limiting. Many other applications and embodiments of the present invention will be apparent in light of this disclosure and the following claims.

What is claimed is:

1. An arbitration module for arbitrating between a plurality of arbitration requests, comprising:
   a plurality of first stage arbiters that receive the plurality of arbitration requests and a signal that indicates a previously granted arbitration request, wherein each of the first stage arbiters, without granting any of the arbitration requests, asserts a high priority request signal if a high priority request is pending at said first stage arbiter and asserts a low priority request signal, if a low priority request is pending at said first stage arbiter;
   a second stage arbiter that receives the high priority request signals and arbitrates between high priority requests, when high priority requests are pending at one or more of said first stage arbiters, wherein if a high priority request is not pending at any of said first stage arbiters, then a low priority request is granted by a low priority request handler; and
   a data handler module that operates in parallel with the second stage arbiter to immediately move data associated with granted requests at any given time.

2. The arbitration module of claim 1, wherein the of arbitration requests are to access a bus and/or memory location and are issued by direct access memory modules.

3. The arbitration module of claim 2, wherein the data handler module includes a first stage data multiplexer and a second stage data multiplexer operating in parallel with the second stage arbiter, and the second stage data multiplexer selects data associated with a particular request after a request is granted.

4. The arbitration module of claim 1, wherein an arbitration counter maintains a count of arbitration requests that are granted.

5. The arbitration module of claim 1, wherein each first stage arbiter can process up to eight arbitration requests at one time.

6. The arbitration module of claim 1, wherein if two requests are received from a same module back-to-back, then one is subtracted from an arbitration count to classify a back-to-back request as a high priority request.

7. The arbitration module of claim 6, wherein a value of the arbitration count and a value that indicates whether a granted request falls within a particular group are sent to all first stage arbiters.

8. The arbitration module of claim 1, wherein a host bus adapter uses the arbitration module to grant access to a host system memory.

9. A method for arbitrating between a plurality of arbitration requests, comprising:
   receiving the plurality of requests and a signal that indicates a previously granted request at a plurality of first stage arbiters, wherein each of the first stage arbiters, without granting any of the arbitration requests, asserts a high priority request signal if a high priority request is pending at said first stage arbiter and asserts a low priority request signal if a low priority request is pending at said first stage arbiter;
   receiving the high priority request signals at a second stage arbiter when high priority requests are pending at one or more of said first stage arbiters, wherein the second stage arbiter arbitrates between pending high priority requests;
   sending a low priority request to a low priority request handler, wherein the low priority request is granted when no high priority requests are pending; and
   transferring data associated with granted requests, wherein the data transfer occurs immediately after the request is granted via a data handler module that operates in parallel with the second stage arbiter.

10. The method of claim 9, wherein the plurality of arbitration requests are to access a bus and/or memory location and are issued by direct access memory modules.

11. The method of claim 10, wherein the data handler module includes a first stage data multiplexer and a second stage data multiplexer operating in parallel with the second stage arbiter, and the second stage data multiplexer selects data associated with a particular request as soon as the request is granted.

12. The method of claim 9, wherein an arbitration counter maintains a count of arbitration requests that are granted.

13. The method of claim 9, wherein each first stage arbiter can process up to eight arbitration requests at one time.

14. The method of claim 9, wherein if two requests are received from a same module back-to-back, then one is subtracted from an arbitration count to classify a back-to-back request as a high priority request.

15. The method of claim 14, wherein a value of the arbitration count and a value that indicates whether a granted request falls within a particular group are sent to all first stage arbiters.

16. The method of claim 9, wherein a host bus adapter uses the arbitration module to grant access to a host system memory.

* * * * *

UNITED STATES PATENT AND TRADEMARK OFFICE
CERTIFICATE OF CORRECTION

| | | |
|---|---|---|
| PATENT NO. | : 7,447,817 B1 | Page 1 of 1 |
| APPLICATION NO. | : 11/430704 | |
| DATED | : November 4, 2008 | |
| INVENTOR(S) | : Srinivas Sripada | |

It is certified that error appears in the above-identified patent and that said Letters Patent is hereby corrected as shown below:

In column 4, line 6, delete "ReqO-ReqN." and insert -- Req0-ReqN. --, therefor.

In column 7, line 18, in claim 1, delete "signal," and insert -- signal --, therefor.

In column 7, line 21, in claim 1, delete "requests," and insert -- requests --, therefor.

In column 7, line 30, in claim 2, after "wherein the" insert -- plurality --.

Signed and Sealed this

Twelfth Day of October, 2010

David J. Kappos
*Director of the United States Patent and Trademark Office*